United States Patent
Suh et al.

(10) Patent No.: US 6,538,975 B1
(45) Date of Patent: Mar. 25, 2003

(54) OPTICAL PICKUP

(75) Inventors: Hea-jung Suh, Seongnam (KR); Chong-sam Chung, Seongnam (KR); Young-man Ahn, Suwon (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 09/471,411

(22) Filed: Dec. 23, 1999

(30) Foreign Application Priority Data

Dec. 23, 1998 (KR) .............................. 98-57696

(51) Int. Cl.⁷ ................................. G11B 7/00
(52) U.S. Cl. .................... 369/112.17; 369/112.19; 369/112.28
(58) Field of Search ..................... 369/44.37, 44.38, 369/44.23, 110.04, 124.1, 124.11, 124.12, 112.12, 112.14, 112.16, 112.17, 112.18, 112.19, 112.21, 112.28, 118

(56) References Cited

U.S. PATENT DOCUMENTS

| | | |
|---|---|---|
| 4,100,577 A | 7/1978 | Naruse et al. |
| 4,136,362 A | 1/1979 | Naruse et al. |
| 4,521,876 A | 6/1985 | Ueno |
| 5,121,378 A * | 6/1992 | Hirose et al. ............. 369/118 |
| 5,311,495 A * | 5/1994 | Ando ..................... 369/44.23 |
| 5,329,517 A * | 7/1994 | Yamaguchi et al. ... 369/110.04 |
| 5,394,381 A * | 2/1995 | Fukumoto et al. ....... 369/13.24 |
| 5,414,541 A | 5/1995 | Sugiyama et al. |
| 5,519,685 A * | 5/1996 | Kato et al. ............. 369/44.37 |
| 5,625,613 A * | 4/1997 | Kato et al. ............ 369/112.19 |
| 5,859,740 A | 1/1999 | Ikeya |
| 6,115,345 A * | 9/2000 | Kato et al. ............ 369/112.19 |

FOREIGN PATENT DOCUMENTS

| | | |
|---|---|---|
| EP | 0 597 202 | 5/1994 |
| JP | 60-246-029 | 12/1985 |
| JP | 61-250843 | 11/1986 |
| JP | 62-114130 | 5/1987 |
| JP | 4-366428 | 12/1992 |
| JP | 5-15131 | 2/1993 |
| JP | 5-325251 | 12/1993 |
| JP | 6-15303 | 5/1994 |
| JP | 6-150363 | 5/1994 |
| JP | 6-295455 | 10/1994 |
| JP | 07-230629 | 8/1995 |
| JP | 08-022620 | 1/1996 |
| JP | 09-073650 | 3/1997 |
| JP | 10-027347 | 1/1998 |

\* cited by examiner

*Primary Examiner*—Thang V. Tran
(74) *Attorney, Agent, or Firm*—Burns, Doane, Swecker & Mathis, LLP

(57) ABSTRACT

An optical pickup capable of reducing cross-talk due to signal interference of adjacent tracks of an optical medium during playback of a radio frequency (RF) signal from a main track of the optical recording medium. In the optical pickup, optical spots can be converged on the main track and the adjacent tracks of the recording medium without a time lag, wherein different polarized component beams are focused as a primary optical spot and secondary optical spots on the main and adjacent tracks, respectively, of the optical recording medium. Thus, the primary optical spot and the secondary optical spots, which have different polarized components, can be separately received by different light receiving portions. Also, the optical spots are photo-electrically converted in the light receiving portions and are differentially amplified through multiplication using a predetermined operation constant, thereby reducing cross-talk from a detected RF signal. For the convergence of optical spots on the adjacent tracks without time lag relative to the optical spot formed on the major track, a beam shaping unit having a shield plate, or transmission or reflection type phase difference prism is adopted.

6 Claims, 12 Drawing Sheets

OPTICAL PICKUP

BACKGROUND OF THE INVENTION

1. Field of the Invention

The present invention relates to an optical pickup capable of recording or reproducing information on or from an optical recording medium, and more particularly, to an optical pickup capable of reducing cross-talk by signal interference of adjacent tracks during playback of information from a main track.

2. Description of the Related Art

Recently, for high-density recording media, development of an optical pickup adopting a light source having a relatively short wavelength and an objective lens having a relatively large numerical aperture (NA), is increasing. For example, due to an increasing tendency toward use of a digital video disc (DVD), rather than a compact disc (CD), the configuration of an optical pickup has also changed. That is, development of an optical pickup adopting a light source having a wavelength of about 650 nm and an NA of 0.6, rather than an optical pickup adopting a light source having a wavelength of about 780 nm, i.e., infrared rays, and an NA of 0.45, has increased. By replacing the optical pickup, a high-density optical recording medium having a narrow track pitch can be adopted for information recording/playback.

As a track pitch which is the interval between adjacent tracks become narrow, there is concern about deterioration of a playback signal due to signal interference of the adjacent tracks. Such playback signal deterioration due to signal interference of adjacent tracks is referred to as "cross-talk", the allowable range of which differs according to the type of optical recording medium. For instance, a DVD-ROM requires a cross-talk level of −30 dB or less.

As shown in FIG. 1, a conventional optical pickup capable of reducing cross-talk includes a light source 11, a grating 13 for diffractingly transmitting a light beam emitted from the light source 11 to produce 0th-order and ±1st-order diffracted beams, a beam splitter 15 for changing the traveling path of the beam incident thereto, an objective lens 16 for converging the incident light to form an optical spot on the optical recording medium 10, a photodetector 19 for receiving beams that have been reflected by the optical recording medium 10 and passed through the beam splitter 15, and a light receiving lens 19 arranged between the beam splitter 15 and the photodetector 19.

The 0th-order and the 1st-order diffracted beams, which have been diffracted by the grating 13, are simultaneously condensed as three optical spots S1, S2 and S3 on different positions of the optical recording medium 10, as shown in FIG. 2. That is, the 0th-order diffracted beam forms the optical spot S1 on a main track T1 from which an information signal is reproduced, while the 1st-order diffracted beams form the optical spots S2 and S3 on first and second adjacent tracks T2 and T3 adjacent at either side of the main track T1. For reference, the optical spots S1, S2 and S3 are formed beyond the corresponding tracks. That is, due to the narrow width of the tracks, the optical spots S1, S2 and S3 partially extend to the adjacent tracks.

Also, as shown in FIG. 2, the optical spots S1, S2 and S3 are formed on the optical recording medium 10 with a time lag. In other words, the optical spot S2 formed on the first adjacent track T2 precedes the optical spot S1 formed on the main track T1, and the optical spot S3 formed on the third adjacent track T3 is delayed relative to the optical spot S1.

The optical spots S1, S2 and S3 enter the photodetector 19 through the objective lens 16, the beam splitter 15 and the light receiving lens 17. As shown in FIG. 3, the photodetector 19 includes first through third light receiving portions A, B and C for respectively receiving the 0-th order and 1st-order diffracted beams, which have been reflected by the optical recording medium 10, and for photoelectrically converting the received 0-th order and 1st-order diffracted beams, respectively.

In the optical pickup having the above configuration, an information (radio frequency, RF) signal to be reproduced is reflected by the main track T1 and then received by the first light receiving portion A. Also, a part of the optical spot S1 of the 0-th order diffracted beam is formed on the first and second adjacent tracks T2 and T3, wherein RF signals of the first and second adjacent tracks T2 and T3, which are received by the first light receiving portion A, can be detected based on the RF signals of the second and third light receiving portions B and C, respectively.

In other words, the RF signal of the main track T1 is detected through operation with the signals detected from the first and second adjacent tracks T2 and T3, which is expressed by the following formula $$RF\ \text{signal} = RF\ \text{signal(first light receiving portion)} - K \times [RF\ \text{signal (second light receiving portion)} + RF\ \text{signal(third light receiving portion)}] \quad (1)$$

where K is an operation constant which minimizes jitter of the RF signal, that is, cross-tack due to signal interference of adjacent tracks.

In the optical pickup having the above configuration, the signals detected by the second and third light receiving portions B and C precedes or are delayed relative to the signal detected by the first light receiving portion A. That is, the signals of the first and second adjacent tracks T2 and T3, which are received by the first receiving portion A, are detected ahead or behind the detection of the optical spot S1 formed on the main track T1. Thus, it is basically impossible to operate the RF signals in real-time.

Meanwhile, as shown in FIG. 4, when an optical pickup is configured such that a time lag in forming the optical spots S1, S2' and S3' on the main track T1 and the first and second adjacent tracks T2 and T3, does not occur, as shown in FIG. 5, all three optical spots are received by the first light receiving portion A of the photodetector 19. In such a case, it is impossible to selectively detect the RF signal recorded on the main track T1.

Another conventional optical pickup capable of reducing cross-talk during playback due to signal interference of adjacent tracks is disclosed in Japanese Patent Publication No. Hei 6-150363 (dated May 31, 1994).

The disclosed optical pickup is characterized in that an optical spot formed on a main track and optical spots formed on adjacent tracks have a phase difference. As shown in FIG. 6, the optical pickup includes first and second light sources 21 and 22, a polarization beam splitter 24, a beam splitter 25, a phase plate 23 disposed between the second light source 22 and the polarization beam splitter 24, an objective lens 26, a polarization hologram optical element (HOE) 27, and a photodetector 28 for receiving beams that have been emitted from the first and second light sources 21 and 22 and reflected by an optical recording medium 20.

The first light source 21 emits a linearly polarized coherent light beam. The traveling path of the beam emitted from the first light source 21 is changed via the polarization beam splitter 24 and the beam splitter 25 toward the optical recording medium 20. The beam that has passed through the beam splitter 25 is converged by the objective lens 26 on the main track of the optical recording medium 20. The second light source 22 emits a linearly polarized coherent light beam having a polarization perpendicular to the direction of the beam from the first light source 21. The phase plate 23 transmits the incident beam from the second light source 22. The phase plate 23 is stepped with a different thickness d such that a transmission beam has a beam intensity distribution having at least two peaks at the center of the optical axis. In the optical pickup, the beam emitted from the first light source 21 is used as a primary beam, while that emitted from the second light source 22 is used as a secondary beam. The polarization beam splitter 24 transmits the beam from the first light source 22, and reflects the beam from the second light source 22, such that the beams head toward the optical recording medium 20. The polarization HOE 27 is disposed on the optical path between the beam splitter 25 and the photodetector 28, and selectively transmits the incident primary and secondary beams, which have been reflected by the optical recording medium 20. The photodetector 28 separately detects the intensity of the primary and secondary beams that have passed through the polarization HOE 27.

In the optical pickup having the above configuration, a polarized component of an optical signal read from the main track, and polarized components of optical signals from the adjacent tracks have a phase difference of 180°, so that the RF signal of the main track can be separated by the polarization HOE 27 without a need to provide a time lag in forming optical spots on the main track and the adjacent tracks. However, two optical spots, which are separated by using the phase plate 23, have a constant interval of 0.6 $\mu$m therebetween. In other words, because the optical spot interval is not variable, cross-talk signals from adjacent tracks cannot be effectively removed when the track pitch is less than or greater than 0.3 $\mu$m, even though the phase plate 23 is effective in reducing cross-talk during playback from an optical recording medium having a track pitch of about 0.3 $\mu$m.

SUMMARY OF THE INVENTION

An object of the present invention is to provide an optical pickup capable of separating signals from a main track and first and second adjacent tracks during playback, in which an optical spot is converged on the main track, and other optical spots are converged across the first and second adjacent tracks, without a time lag relative to the optical spot formed on the main track.

Another object of the present invention is to provide an optical pickup capable of detecting a high-quality radio frequency (RF) signal, in which cross-talk can be reduced by operating a signal from a primary optical spot formed on a main track of an optical recording medium with signals from secondary optical spots formed on adjacent tracks.

According to an aspect of the object, the present invention provides an optical pickup comprising: a light source for emitting a light beam; a first light path changing means disposed between the light source and an optical recording medium, for changing the traveling path of an incident beam; a first polarization beam splitter disposed between the first light path changing means and the optical recording medium, for selectively transmitting or reflecting the incident beam according to polarized component to diverge first and second polarized component beams from the incident beam; a beam shaping unit disposed on the optical path of the second polarized component beam diverged by the first polarization beam splitter, the beam shaping unit for shaping the second polarized component beam; a second optical path changing means disposed on the optical path between the first polarization beam splitter and the optical recording medium, for making the first and second polarized component beams diverged by the first polarization beam splitter head in the same optical path; an objective lens disposed between the second optical path changing means and the optical recording medium, for converging the first and second polarized component beams incident thereto onto the optical recording medium; a second polarization beam splitter for making the first and second polarized component beams that have been reflected by the optical recording medium and incident thereto through the objective lens, the second optical path changing mean, the first polarization beam splitter and the first optical path changing means in sequence head in different optical paths; a photodetector having first and second light receiving portions for receiving the first and second polarized component beams, respectively, diverged by the second polarization beam splitter; and an operation unit for operating signals received by the first and second light receiving portions of the photodetector to eliminate cross-talk from a detected radio frequency (RF) signal.

According to another aspect of the object, the present invention provides an optical pickup comprising: a first optical module including a first light source for emitting a light beam, and a first photodetector for receiving the beam that has been emitted from the first light source and reflected by an optical recording medium; a second optical module including a second light source for emitting a light beam, and a second photodetector for receiving the beam that has been emitted from the second light source and reflected by the optical recording medium; a polarization beam splitter disposed between the first and second optical modules, and the optical recording medium, for selectively transmitting or deflecting the beam incident thereto according to polarization components, to change the traveling paths of the incident beams; an objective lens for condensing the beam incident thereto so as to form optical spots on a main track and first and second adjacent tracks of the optical recording medium; a transmission type phase difference prism disposed on the optical path between the second light source and the polarization beam splitter, for shaping the beam emitted from the second optical module to form an oval-shaped optical spot across the adjacent tracks of the main track, in a radial direction of the optical recording medium; and an operation unit for operating signals received by the first and second photodetectors to eliminate cross-talk from a detected ratio frequency (RF) signal.

In another embodiment, the present invention provides an optical pickup comprising: a light source for emitting a light beam; a beam splitter disposed between the light source and an optical recording medium, the beam splitter for changing the traveling path of the beam incident thereto; a first polarization beam splitter disposed between the beam splitter and the optical recording medium, for diverging first and second polarized component beams from the incident beam according to polarization directions, to reflect the first polarized component beam and to transmit the second polarized component beam; a reflection type phase difference prism for reflecting the second polarization component beam diverged by the first polarization beam splitter, and for shaping the beam incident thereto such that the beam reflected by the same is converged as optical spots on the adjacent tracks of a main track of the optical recording medium in a radial direction of the optical recording medium; an objective lens disposed between the polarization beam splitter and the optical recording medium, for condensing the first and second polarized component beams incident thereto on the optical recording medium; a second polarization beam splitter for directing the first and second polarized component beams incident thereto, which have been reflected by the optical recording medium and passed through the beam splitter, toward different optical paths; first and second photodetectors for receiving the first and second polarized component beams diverged by the second polarization beam splitter, respectively; and an operation unit for operating signals received by the first and second photodetectors, to eliminate cross-talk from a detected radio frequency (RF) signal.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Figure 1:
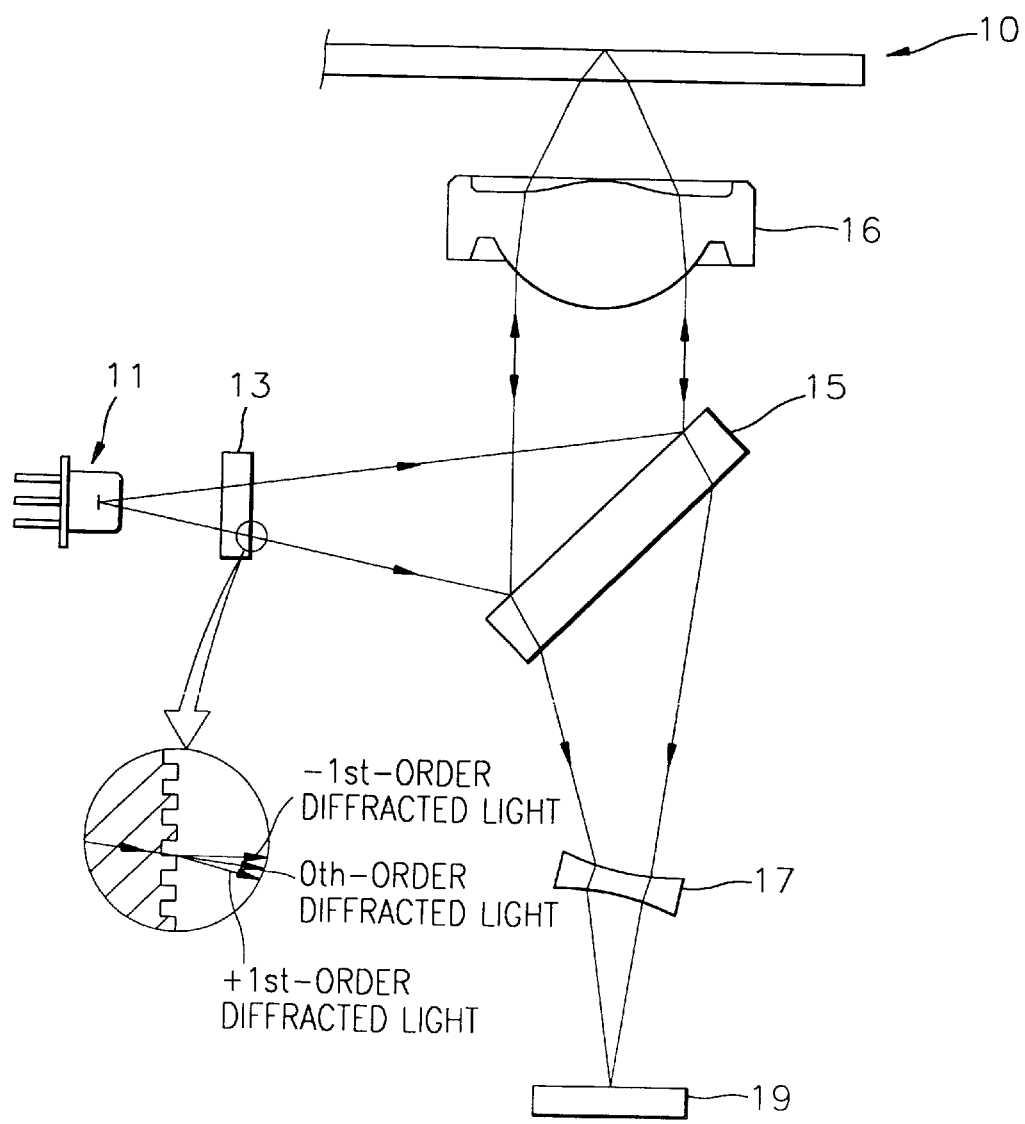
FIG. 1 is a schematic view showing the optical arrangement of a conventional optical pickup.
Figures 2, 3:
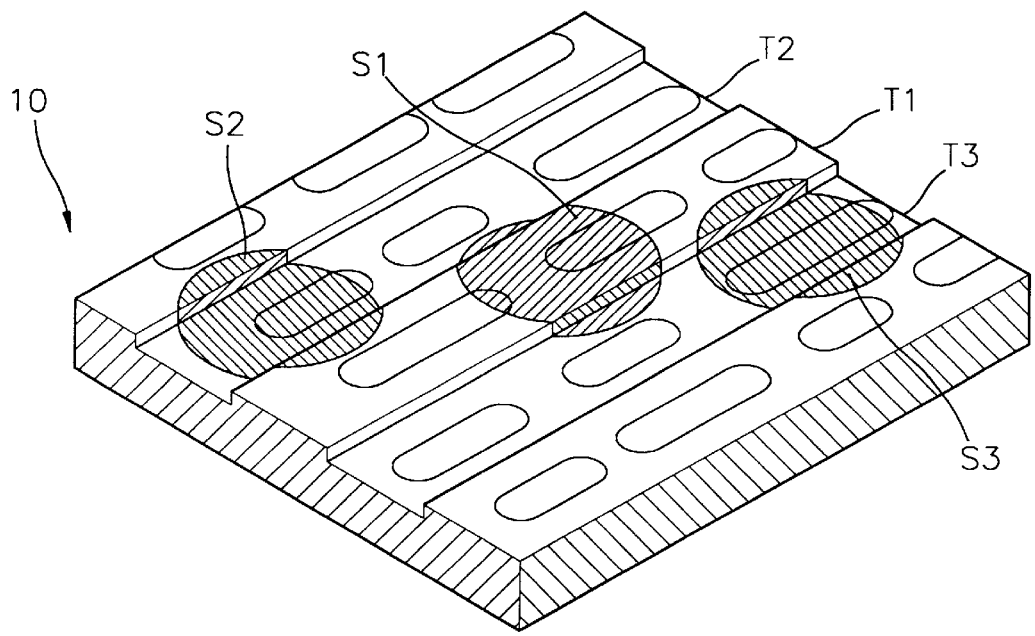
FIG. 2 is a partial perspective view of an optical recording medium, illustrating the shape of optical spots formed thereon by the optical pickup of FIG. 1.
FIG. 3 is a schematic view showing the optical spots received by the photodetector of FIG. 1.
Figure 4:
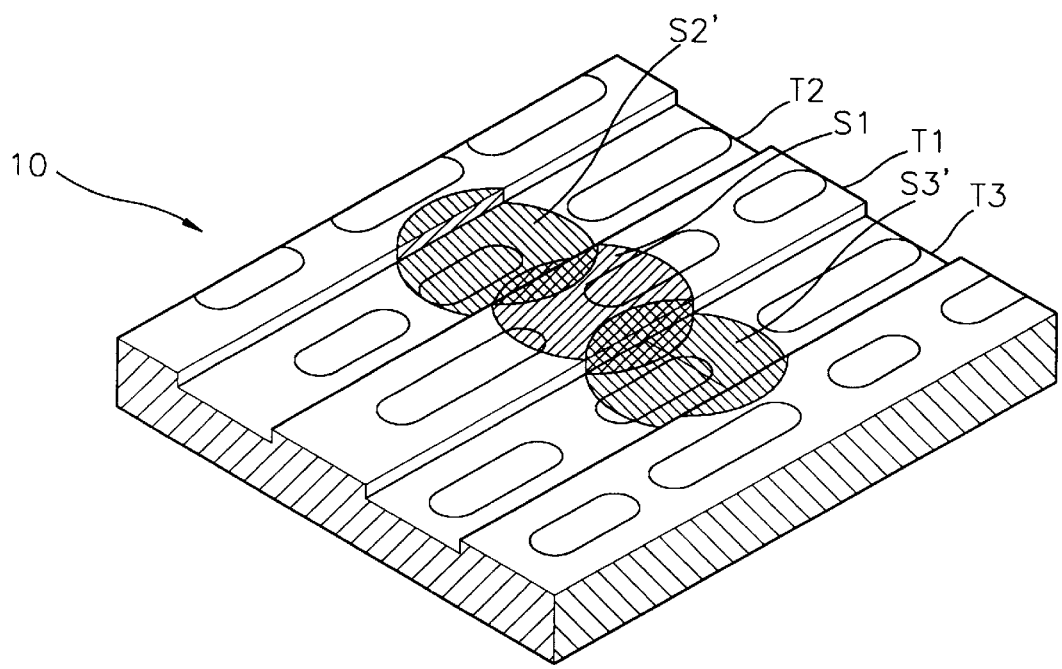
FIG. 4 is a partial perspective view of an optical recording medium, showing the shape of optical spots formed thereon by another conventional optical pickup.
Figure 5:
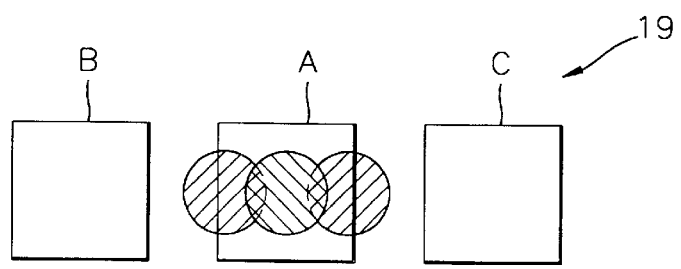
FIG. 5 is a schematic view showing the optical spots received by the photodetector of FIG. 4.
Figure 6:
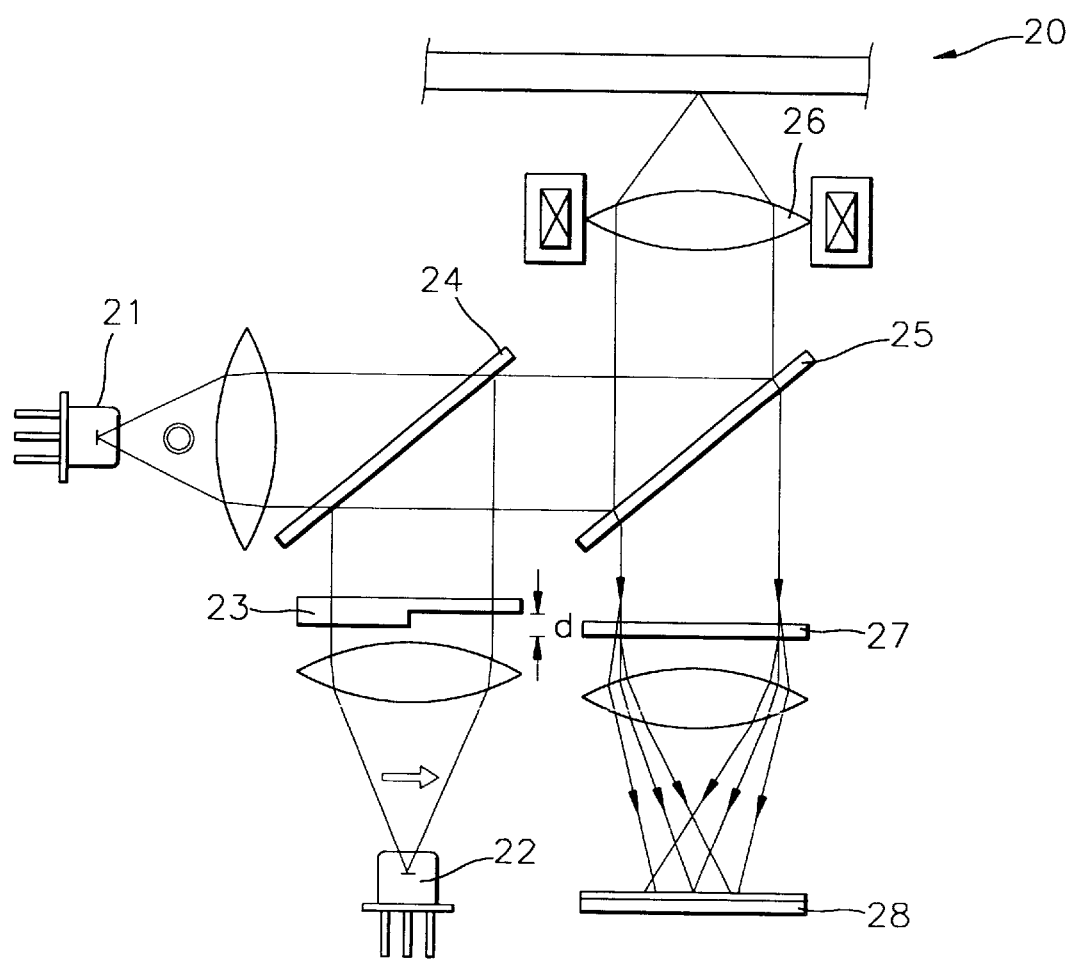
FIG. 6 is a schematic view showing the optical arrangement of another conventional optical pickup.
Figure 7:
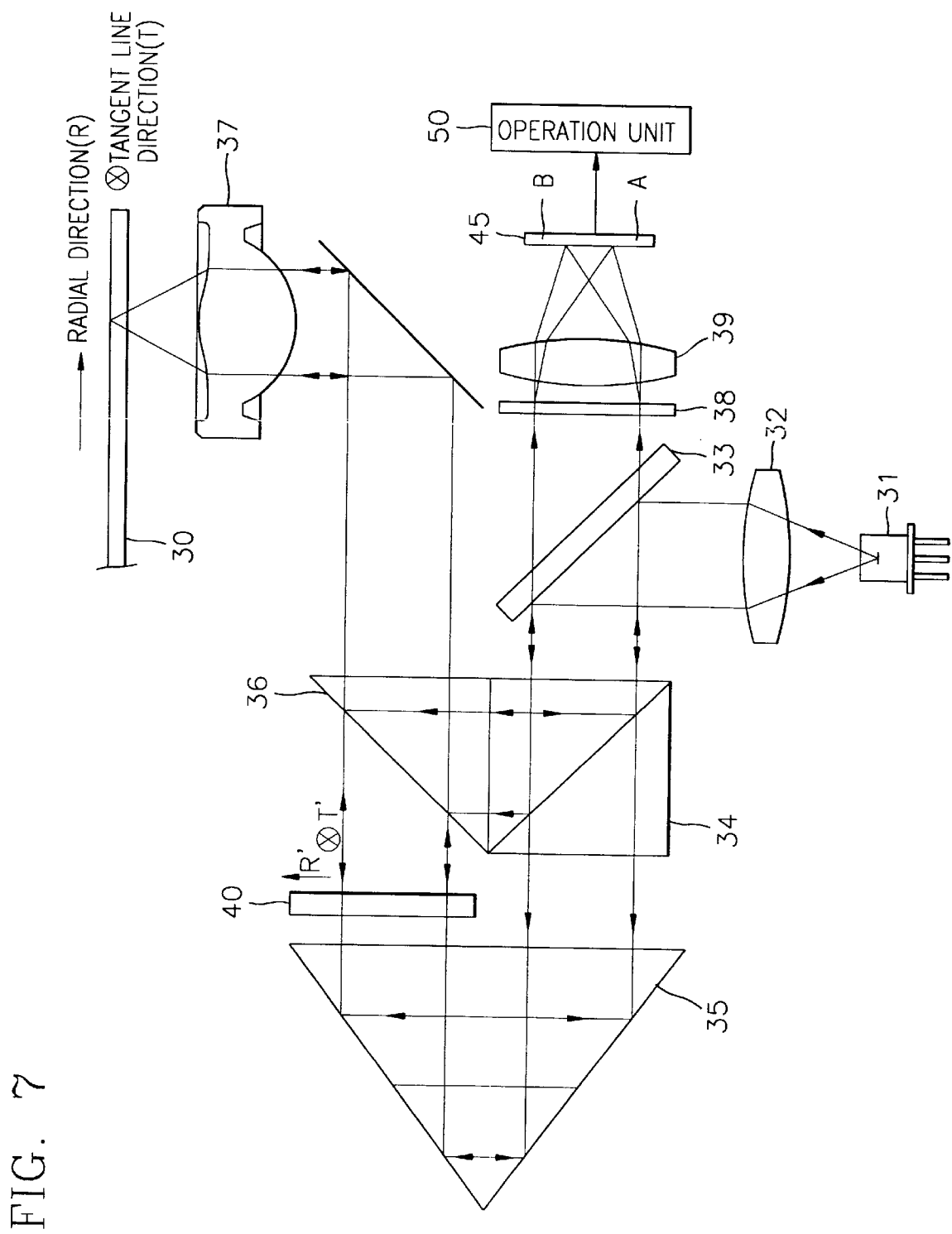
FIG. 7 is a schematic view showing the optical arrangement of an optical pickup according to a first embodiment of the present invention.

Referring to FIG. 7, an optical pickup according to a first embodiment of the present invention includes a light source 31 for emitting a light beam, a first optical path changing means 33, a first polarization beam splitter 34 for diverging first and second polarized component beams from the incident beam, a beam shaping unit 40 for shaping the second polarized component beam, a second optical path changing means, an objective lens 37, a second polarization beam splitter 38 for splitting the incident beam that has been reflected by the optical recording medium 30, a photodetector 45 for receiving the first and second polarized component beams, and an operation unit 50 for operating signals received by the photodetector 45 to eliminate cross-talk from a radio frequency (RF) signal to be output.

The first light path changing means 33 is disposed on the optical path between the first polarization beam splitter 34 and the second polarization beam splitter 38, and changes the traveling path of the beam such that the incident beam from the light source 31 heads toward the first polarization beam splitter 34 and the beam from the first polarization beam splitter 34 heads toward the photodetector 45. The first optical path changing means 33 may be a beam splitter for splitting the incident beam with a predetermined light amount ratio and for transmitting or reflecting the diverged beam components. Also, a hologram optical element (HOE, not shown) for directly or diffractingly transmitting the beam incident thereto according to the light incident direction, to change the traveling path of the incident beam, may be adopted.

Figure 8:
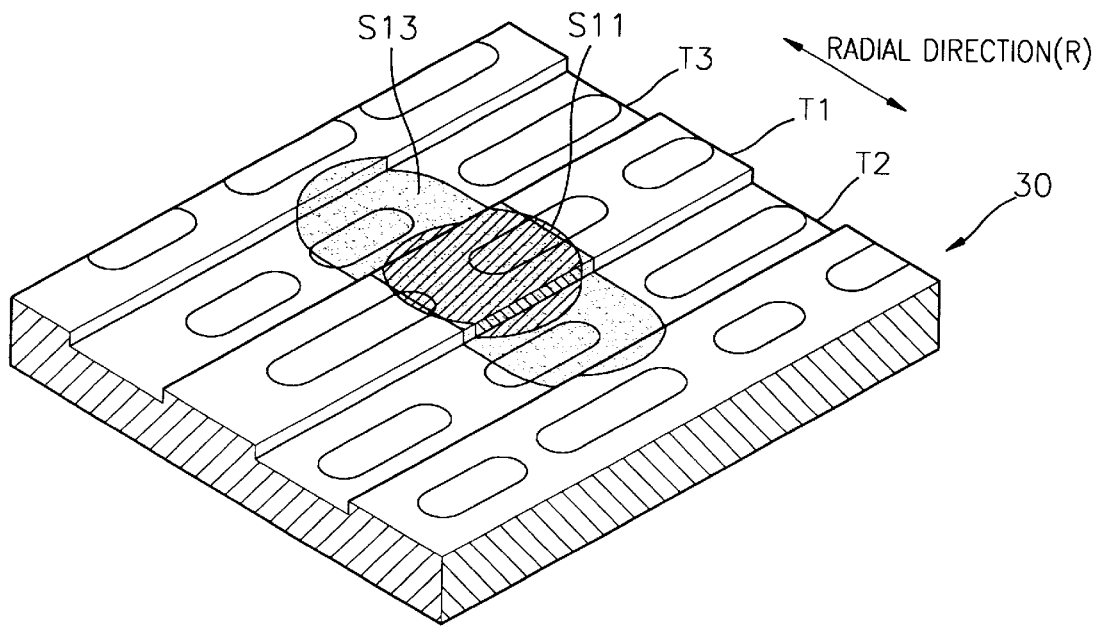
FIG. 8 is a partial perspective view of an optical recording medium, showing the shape of optical spots formed thereon by the optical pickup of FIG. 7.

The first polarization beam splitter 34 selectively transmits or reflects the incident beam according to polarized components, to diverge first and second polarized component beams from the incident beam, which allows the different polarized component beams to form an optical spot S11 on a main track T1 and an optical spot S13 across the main tracks T1 and adjacent tracks T2 and T3, respectively, without a time lag in a radial direction of the optical recording medium 30. Referring to FIG. 8, the first polarized component beam is converged on the main track T1 on which an RF signal has been recorded by the objective lens 37. Also, the second polarized component beam is formed across the main track T1 and the adjacent tracks T2 and T3, through the beam shaping unit 40.

Figure 9:
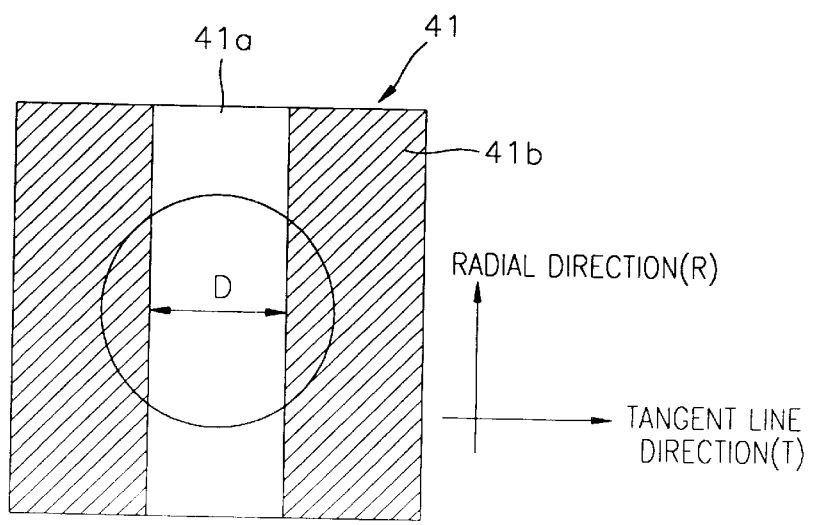
FIG. 9 is a schematic view of a shield plate, which is an embodiment of the beam shaping unit of FIG. 7.

The beam shaping unit 40 shapes the second polarized component beam such that the optical spot S13 is formed across the main track T1 and the adjacent tracks T2 and T3 of the optical recording medium 30. Such beam shaping unit 40 may be a shield plate 41, as shown in FIG. 9, which has a transmission region 41a and a shield region 41b, wherein the transmission region 41a transmits the incident beam, and the shield region 41b which is located outside the transmission region 41a, shields a part of the incident beam in a tangent line direction of the optical recording medium 30. In other words, most of the incident beam that has not passed through the shield plate 41 is converged on the main track T1 of the optical recording medium 30. The second polarized component beam is shaped in an oval shape through the shield plate 41 and forms the oval optical spot S3 across the main track T1 and the first and second adjacent tracks T2 and T3 without a time lag relative to the optical spot S1 converged from the first polarized component beam, wherein the major axis of the oval optical spot S3 is parallel to the radial direction of the optical recording medium 30.

Figure 10:
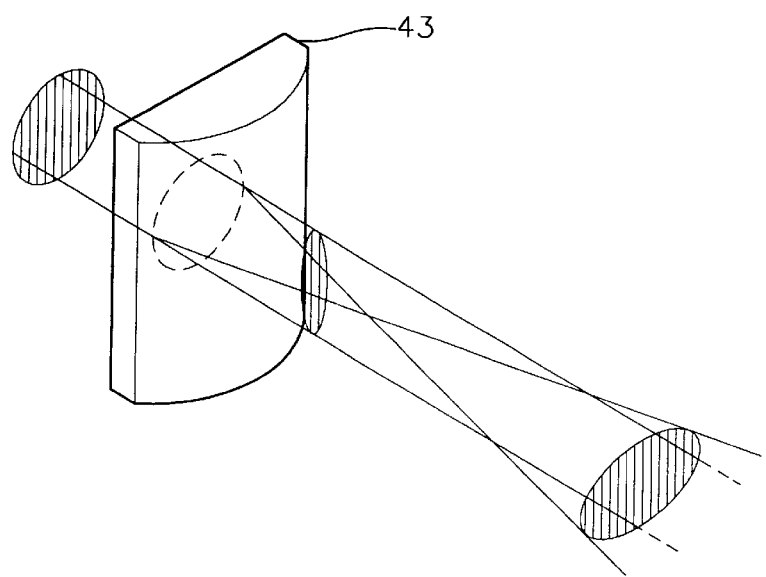
FIG. 10 is a schematic perspective view of a cylindrical lens, which is another embodiment of the beam shaping unit of FIG. 7.

Also, the beam shaping unit 40 may be a cylindrical lens 43 having the structure shown in FIG. 10. The cylindrical lens 43 shapes the second polarized component beam such that an oval optical spot is formed on the optical recording medium 30, in which the major axis is parallel to the radial direction of the optical recording medium 30 and the minor axis is parallel to the tangent line direction thereof.

The second optical path changing means makes the first polarized component beam diverged by the first polarization beam splitter 34 and the second polarized component beam that has passed through the beam shaping unit 40 head in the same direction. To this end, the second optical path changing means includes a reflection prism 35 and a beam splitter 36. The reflection prism 35 twice reflects the second polarized component beam that has been diverged by the first polarization beam splitter 34 and then entered thereinto such that the reflection beam is emitted while being shifted parallel to the incident beam, in the opposite direction to the light incident direction. Alternatively, the reflection prism 35 may be replaced with two reflection mirrors, and may be arranged to reflect the first polarized component light instead of the second polarized component light. The beam splitter 36 selectively transmits or reflects the first polarized component beam diverged by the first polarization beam splitter 34 and the beam which has passed through the reflection prism 35, such that the two beams head toward the optical recording medium 30.

The second polarization beam splitter 38 again diverges the first and second polarized component beams from the beam that has been reflected by the optical recording medium 30 such that the two polarized component beams travel along different optical paths. The first and second polarized component beams land on different sites of the photodetector 45, for example, on the first and second light receiving portions A and B. The transmission type polarization beam splitter, which is shown in FIG. 7, is merely illustrative, and a transmission/reflection type polarization beam splitter which selectively transmits or reflects the beam incident thereto according to polarized components to split the incident beam, may be adopted.

The present embodiment of the optical pickup according to the present invention may further comprise a collimating lens 32, which is disposed between the light source 31 and the first light path changing means 33, for converging the diverged beam incident thereto, and a condensing lens 39 which is disposed between the second polarization beam splitter 38 and the photodetector 45.

Figure 11:
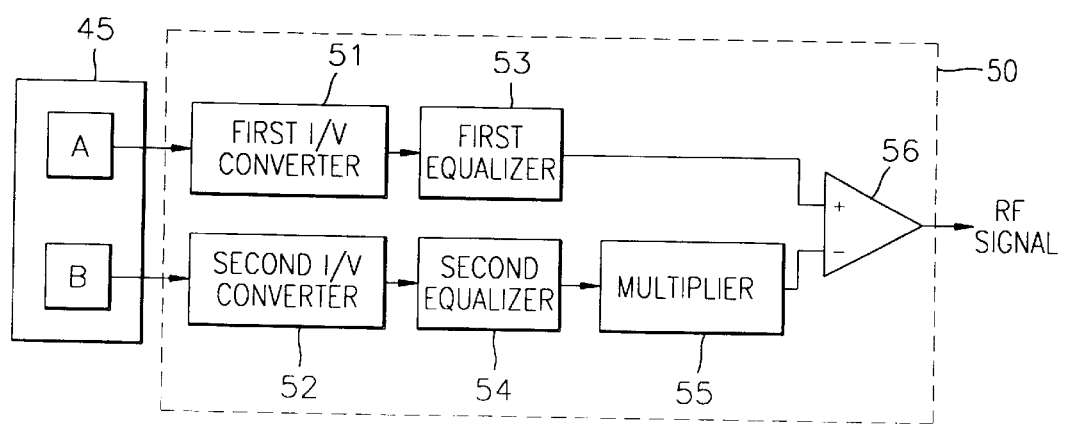
FIG. 11 shows the optical spots received by the photodetector of FIG. 7 and shows a circuit structure of the operation unit of FIG. 7.

In the photodetector 45, the first and second light receiving portions A and B are arranged, as shown in FIG. 11. The operation unit 50 operates the signals received by the first and second light receiving portions A and B to eliminate cross-talk which exists in the RF signal read from the main track T1. Referring to FIG. 11, the operation unit 50 includes first and second current-to-voltage (I/V) converters 51 and 52 for converting current signals that have been photoelectrically converted in the first and second light receiving portions A and B into voltage signals, a multiplier 55 for multiplying the voltage value from the second I/V converter 52 by a constant K, and a differential amplifier 56 for differentially amplifying the signals from the first I/V converter 51 and from the multiplier 55, and for outputting an RF signal from which cross-talk has been eliminated. It is preferable that the operation unit 50 further includes first and second equalizers 53 and 54 for compensating for deterioration of frequency characteristics during playback.

The operation constant K is determined such that cross-talk due to signal interference of adjacent tracks, i.e., jitter of the RF signal, which is present in the RF signal to be output through the differential amplifier 56, can be minimized.

Figure 12:
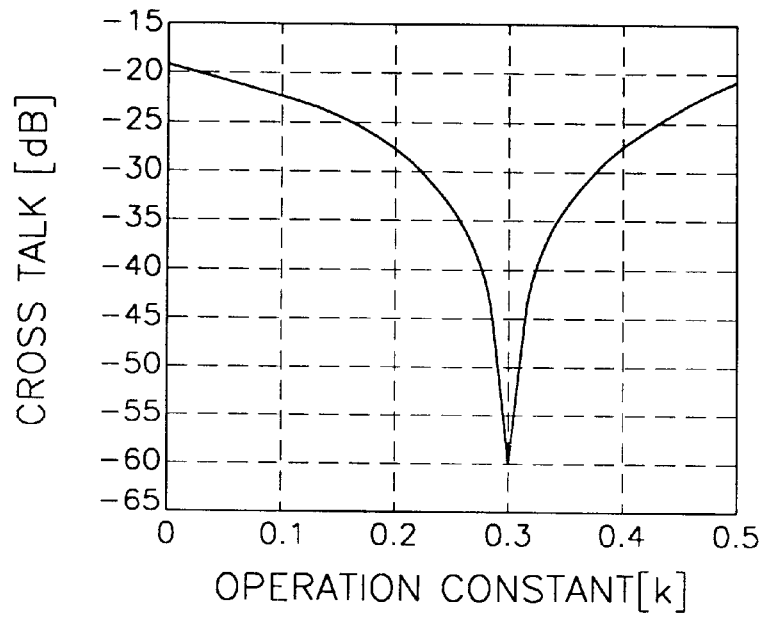
FIG. 12 is a graph showing a variation of cross-talk in the optical pickup of FIG. 7 with respect to operation constant K.

That is, the operation constant K, which is used in the operation in the multiplier 5, is determined based on the relationship with cross-talk, which is illustrated in FIG. 12. As shown in FIG. 12, the operation constant K which minimizes cross-talk to −60 dB is 0.3, and thus cross-talk due to signal interference of adjacent tracks can be eliminated by performing multiplication in the multiplier 55 with the operation constant K=0.3.

Table 1 shows the cross-talk decrease effect of the optical pickup according to the first embodiment of the present invention, which has the above configuration. In particular, cross-talk and jitter distributions with respect to a variation of a ratio D of the width of the transmission region 41a in the tangent line direction, of the shield plate 41 of FIG. 9, to the diameter of the beam that has passed through the shield plate 41. The ratio D also affects the NA.

TABLE 1

|  | Condition A | | Condition B | | | | |
| --- | --- | --- | --- | --- | --- | --- | --- |
| Ratio D (DA) | 0.8(0.24) | 1.0(0.3) | 0.8(0.24) | 1.8(0.3) | 1.2(0.36) | 1.4(0.42) | 1.6(0.48) |
| Cross-talk [dB], | −73, | −63, | −58, | −60, | −54, | −63, | −56, |
| K | — | — | 0.32 | 0.3 | 0.34 | 0.43 | 0.54 |
| Spot size [μm] | 1.23 | 1.00 | 1.219 | 1.0054 | 0.8631 | 0.7385 | 0.6851 |
| Jitter, | 6.9, | 6.9, | 8.77, | 8.55, | 8.98, | 8.77, | — |
| K | 0.37 | 0.31 | — | 0.2 | — | 0.35 | |

In Table 1, Condition A represents a case when the track pitch is 0.4 μm and the pitch length is 0.25 μm, and Condition B represents-when-the-track pitch is 0.368 μm and the pitch length is 0.25 μm.

Figure 13:
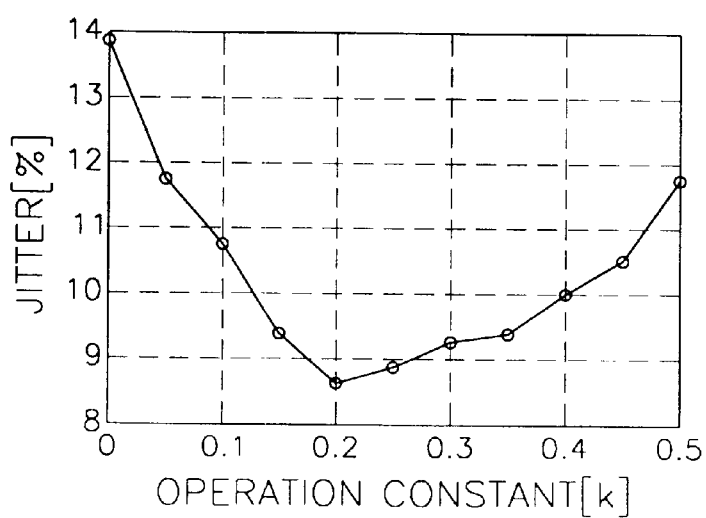
FIG. 13 is a graph showing jitter distribution in the optical pickup of FIG. 7 with respect to operation constant K when the track pitch is 0.368. μm, the length of pits is 0.25 μm and the numerical aperture (NA) of the shield plate in a track direction is 0.3.

As shown in Table 1, under Condition B where the track pitch is narrow relative that of Condition A, as the NA varies in the range of 0.24 to 0.48, although there is an allowable error, the level of cross-talk was about −50 dB and jitter was lowered to 9% or less. In particular, as shown in FIG. 13, when NA=0.3, jitter was the least at 8.6% at K=0.2. Compared to the level of jitter of 8.2%, which was simulated with respect to one track under the assumption that there are no adjacent tracks, it can be concluded that cross-talk due to adjacent tracks can be almost eliminated. Also, since the optical spots are converged side-by-side on the main track and the adjacent tracks, parallel to the radial direction of the optical recording medium, delay of signals during playback from adjacent tracks, relative to the signal from the main track, does not occur.

Figure 14:
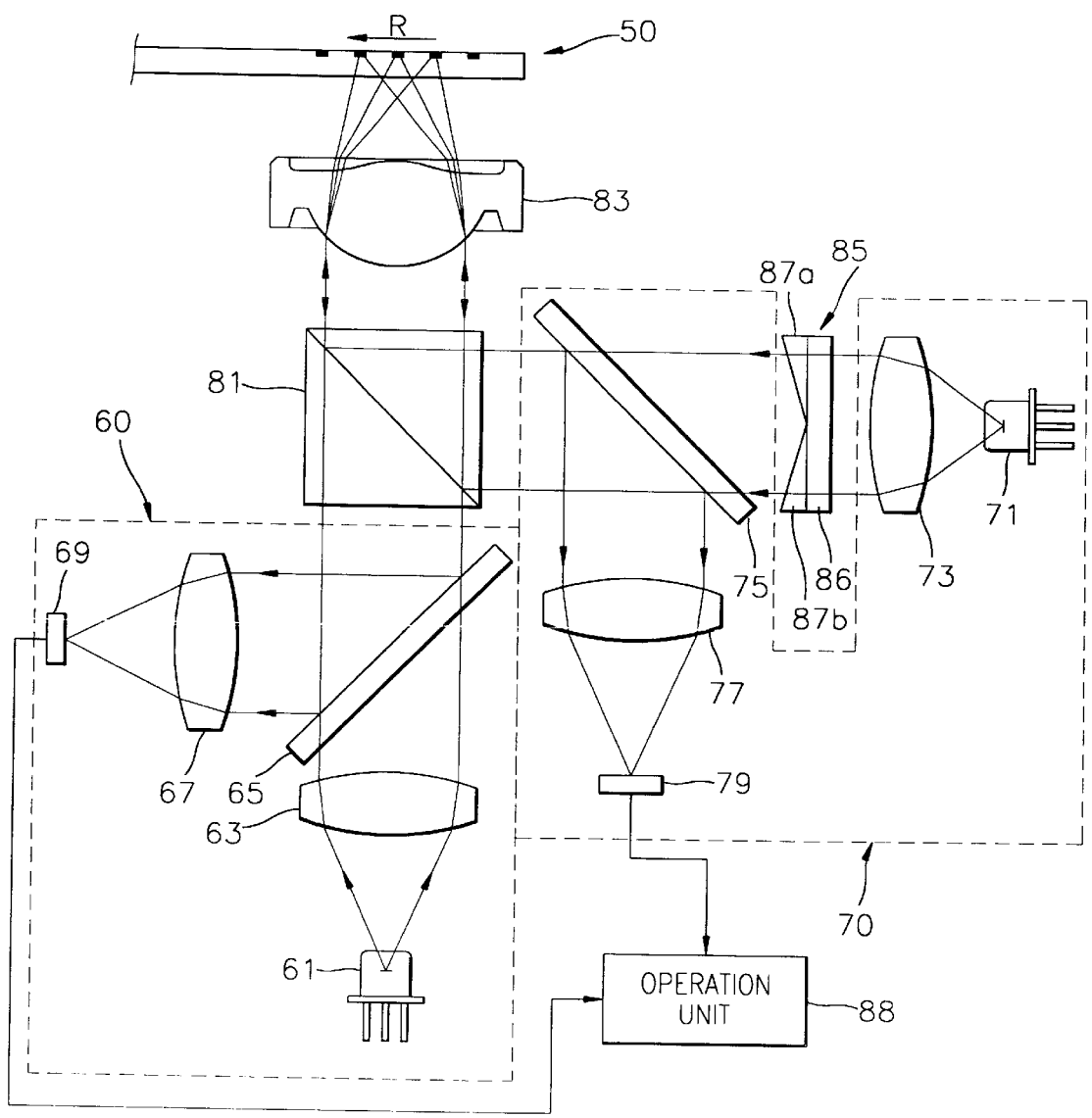
FIG. 14 is a schematic view showing the optical arrangement of an optical pickup according to a second embodiment of the present invention.

Referring to FIG. 14, an optical pickup according to a second embodiment of the present invention includes first and second optical modules 60 and 70, a polarization beam splitter 81 disposed among the first and second optical modules 60 and 70 and the optical recording medium 30, for selectively transmitting or reflecting the beam incident thereto according to polarized components, to change the traveling direction of the incident beam, an objective lens 83, a transmission type phase difference prism 85 for shaping the beam emitted from the second optical module 70 such that the beam is converged on the adjacent tracks of the main track in a radial direction R of the optical recording medium 30, and an operation unit 88 operates the optical signals received by the first and second optical modules 60 and 70 to eliminate cross-talk from the detected RF signal.

The first optical module 60 includes a first light source 61 for emitting a light beam, and a first photodetector 69 for receiving the beams that have been emitted by the first light source 61 and reflected by the optical recording medium 30. The first optical module 60 may further comprise a first beam splitter 65 disposed among the first light source 61, the first photodetector 69 and the polarization beam splitter 81, for making the beam that has been reflected by the optical recording medium 30 and entered into the same, toward the first photodetector 69. Also, the first beam splitter 65 may be replaced with an HOE (not shown) for directly or diffractingly transmitting the beam incident thereto according to light incident direction.

Also, the first optical module 60 may further comprise a first collimating lens 63 disposed between the first light source 61 and the first beam splitter 65, for converging the emanated beam emitted from the first light source 61, and a first condensing lens 67 disposed between the first beam splitter 65 and the first photodetector 69, for converging the parallel beam.

The second optical module 70 includes a second light source 71 for emitting a light beam, and a second photodetector 79 for receiving the beams that have been emitted by the second light source 71 and reflected by the optical recording medium 30. The second optical module 70 may further comprise a second beam splitter 75 disposed among the second light source 71, the second photodetector 79 and the polarization beam splitter 81, for making the beam that has been reflected by the optical recording medium 30 and entered into the same, toward the second photodetector 79. Also, the second optical module 70 may further comprise a second collimating lens 73 disposed between the second light source 71 and the second beam splitter 75, for converging the emanated beam emitted from the second light source 71, and a second condensing lens 77 disposed between the second beam splitter 75 and the second photodetector 79, for converging the parallel beam.

Figure 15:
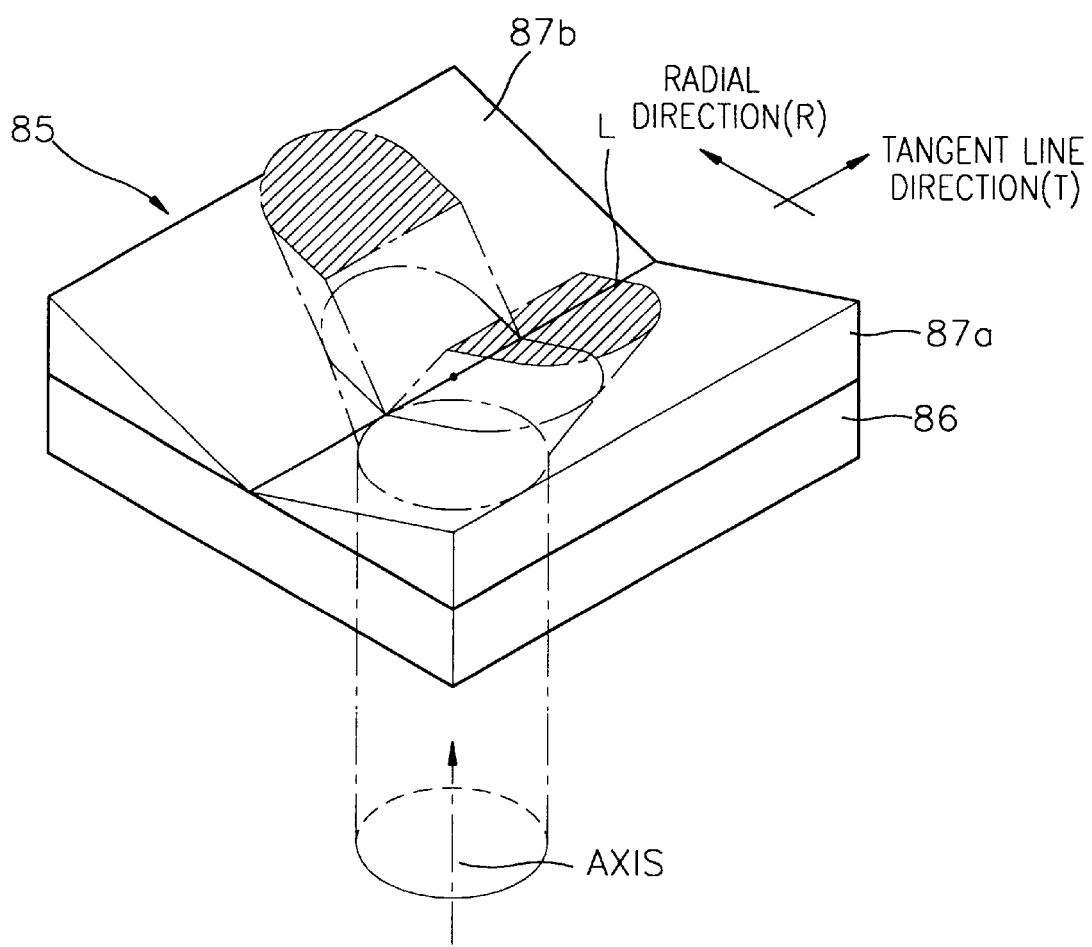
FIG. 15 is a schematic perspective view of the transmission type phase difference prism of FIG. 14.

The transmission type phase difference prism 85 is arranged on the optical path between the second light source 71 and the polarization beam splitter 81, such that the beam emitted from the second light source 71 is converged on the adjacent tracks in the radial direction of the optical recording medium 30, side by side with respect to the optical spot converged on the main track. To this end, as shown in FIGS. 14 and 15, the transmission type phase difference prism 85 includes a transparent plate 86 for transmitting the incident beam, and first and second prisms 87a and 87b which are tapered inwards and symmetrical with respect to a line segment "L", which is parallel to the tangent line direction T of the optical recording medium 30 and the optical axis AXIS of the incident beam passes. That is, beam emitting surfaces of the first and second prisms 87a and 87b are declined inwards. Thus, when a circular beam is incident onto the transmission type phase difference prism 85, an oval beam, which is emanated in the radial direction R' of the optical recording medium, is emitted through the phase difference prism 85, and is converged on the adjacent tracks of the optical recording medium 30 without delay relative to the spot formed on the main track. Here, according to the slope angle of the first and second prisms 87a and 87b, the beam that has passed through the transmission type phase difference prism 85 may be converged across the main track and the adjacent tracks.

The polarization beam splitter 81 makes one polarized component beam emitted from the first optical module 60 and the other polarized component beam from the second optical module 70 toward the optical recording medium 30. For example, in the case where the polarization beam splitter 81 transmits a P-polarized component beam and reflects an S-polarized component beam, only the S-polarized component of the beam emitted from the first light source 61 is transmitted by the polarization beam splitter 81 and is converged on the optical recording medium 30 through the objective lens 83. Then, the beam reflected by the optical recording medium 30 transmits the polarization beam splitter 81, is reflected by the first beam splitter 65, and enters the first photodetector 69. Meanwhile, only the P-polarized component of the beam emitted from the second light source 71 is reflected by the polarization beam splitter 81 and then enters the optical recording medium 30. Then, the P-polarized component beam reflected by the optical recording medium 30 is reflected by the polarization beam splitter 81 and the second beam splitter 75 in sequence, and then is received by the second photodetector 79. Thus, the optical spots formed on the main track and the adjacent tracks can be separated according to polarized components, and then received by the first and second photodetectors 69 and 79, respectively, The operation unit 88 includes first and second current-to-voltage converters for converting current signals that have been photoelectrically converted in the first and second photodetectors 69 and 79 into voltage signals, a multiplier for multiplying the voltage value from the second current-to-voltage converter by an operation constant K, and a differential amplifier for differentially amplifying the signals from the first current-to-voltage converter and from the multiplier, and for outputting an RF signal from which cross-tack has been eliminated. The operation unit 88 that has the above structure is actually the same as the operation unit 50 described with reference to FIG. 11, and thus a detailed description thereof will be omitted.

Figure 16:
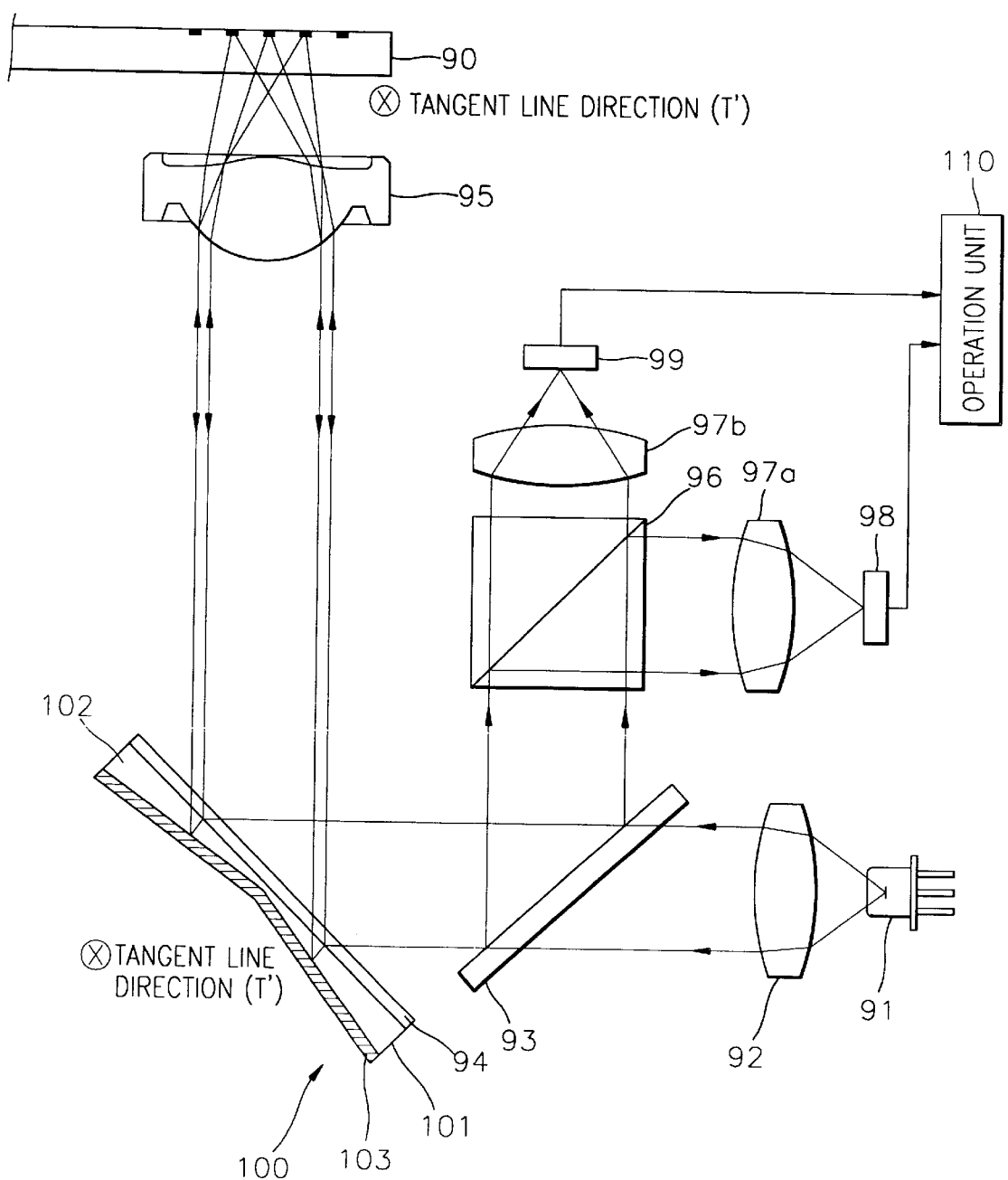
FIG. 16 is a schematic view showing the optical arrangement of an optical pickup according to a third embodiment of the present invention.

Referring to FIG. 16, a third embodiment of an optical pickup according to the present invention includes a light source 91, a beam splitter 93 for changing the traveling path of an incident beam, a first polarization beam splitter 94 for selectively transmitting or reflecting the incident beam according to polarized component, a reflection type phase difference prism 100, an objective lens 95, a second polarization beam splitter 96 for making first and second polarized beam components incident thereto toward different traveling paths, first and second photodetectors 98 and 99 for receiving the incident first and second polarized component beams, respectively, and an operation unit 110 for operating the signals received by the first and second photodetectors 98 and 99 to eliminate cross-talk from a detected RF signal.

The beam splitter 93 is arranged on the optical path between the light source 91 and the first polarization beam splitter 94, and changes the traveling path of the beam incident thereto. That is, the beam splitter 93 transmits or reflects the incident beam with a predetermined light amount ratio such that the beam emitted from the light source 91 heads toward the optical recording medium 90 and the beam reflected by the optical recording medium heads toward the second polarization beam splitter 96. Here, the beam splitter 93 may be replaced with an HOE for directly or diffractingly transmitting the beam incident thereto according to the light incident direction.

The first polarization beam splitter 94 is arranged on the optical path between the beam splitter 93 and the reflection type phase difference prism 100 and selectively transmits or reflects the incident beam according to polarized components to diverge first and second polarized components from the incident beam. In the present embodiment, the first polarization beam splitter 94 reflects the first polarized component beam towards the objective lens 95, and transmits the second polarized component beam such that it heads toward the objective lens 95 via the reflection type phase difference prism 100.

The reflection type phase difference prism 100 includes first and second prisms 101 and 102 which are tapered inward and symmetrical with respect to a line segment, which is parallel to the tangent line direction T of the optical recording medium 90 and the optical axis of the incident beam passes, and a reflection member 103 which is formed across one sides of the first and second prisms 101 and 102. For reference, the optical effect of such reflection type phase difference prism 100 is actually the same as that of the transmission type phase difference prism 85 (see FIG. 15), which is described in the second embodiment, when the slope angle of the first and second prisms 101 and 102, which form the reflection type phase difference prism 100, i.e., a phase difference thereof, is half the phase difference of the first and second prisms 87a and 87b of the transmission type phase difference prism 85 according to the second embodiment. The second polarized component beam that has passed through the reflection type phase difference prism 100 is converged on the adjacent tracks of the optical recording medium 90, without a time lag relative to the optical spot formed on the main track. Preferably, the first polarization beam splitter 94 is built-in at the light receiving and emitting surface of the reflection type phase difference prism 100.

The objective lens 95 is arranged on the optical path between the polarization beam splitter 94 and the optical recording medium 90, and converges the incident first and second polarized component beams on the optical recording medium 90. The operation unit 110 is actually the same as that of the second embodiment, and thus a description and illustration thereof will be omitted.

In the present embodiment, the optical pickup may further include a collimating lens 92 disposed on the optical path between the light source 91 and the beam splitter 93, for converging the emanated beam incident thereto, and first and second condensing lenses 97a and 97b for condensing the incident beams, which are arranged between the second polarization beam splitter 96, and the first and second photodetectors 98 and 99, respectively.

Figure 17A:
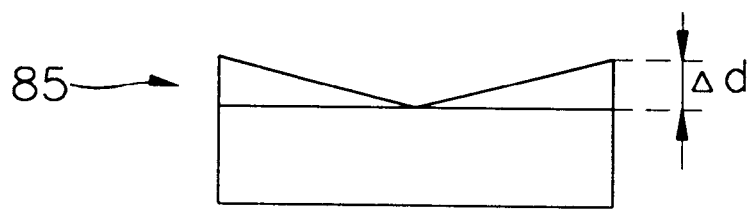
FIGS. 17A and 17B are views illustrating the phase difference of the transmission type phase difference prism of FIG. 14 and that of the reflection type phase difference prism of FIG. 16, respectively.
Figure 17B:
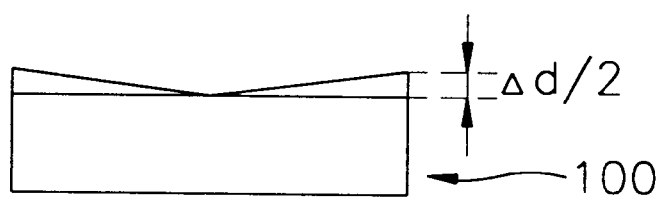

The phase difference (slope angle) in the transmission and reflection type phase difference prisms is determined as follows. In FIG. 17A, which shows the transmission type phase difference prism 85, Δd represents phase difference, which corresponds to the height of the first and second prisms 87a and 87b at the effective diameter of the incident beam. Also, in FIG. 17B, which shows the reflection type phase difference prism 100, Δd/2 represents phase difference, which is half the phase difference Δd of the transmission type phase difference prism.

The phase difference Δd of the transmission type phase difference prism is expressed by the following formula.

$$\Delta d = \frac{\alpha \times 0.35\lambda}{NA \times track\ pitch}, 0.5 < \alpha < 1.5$$

In particular, when the track pitch of an optical recording medium is 0.40 μm and 0.37 μm, the phase difference Δd is equal to 0.8λ/2 and 1.2λ/2, respectively.

As described above, in the optical pickups according to the present invention, one optical spot is converged on the main track while other optical spots are converged across the main track and the adjacent tracks without a time lag relative to the optical spot formed on the main track. Also, during playback, the signal of the main track can be separated from the signals of the adjacent tracks based on the polarization characteristics of the optical spots. A part of signals from the adjacent tracks, which interferes with the RF signal of the main track because the optical spots are converged on the adjacent tracks without a time lag, is multiplied by an operation constant, and then the product is subtracted from the RF signal detected from the main track, thus reducing cross-talk.

In particular, the optical pickup according to the present invention is very useful in enhancing the quality of playback signal from an optical recording medium having a ratio of optical spot to track pitch of 0.6 or less. Also, in the case of adopting the transmission or reflection type phase difference prism, since the phase difference of the phase difference prism can be adjusted, optimal playback can be ensured in accordance to a variation of track pitch.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. An optical pickup comprising:

a light source for emitting a light beam;

a first light path changing means disposed between the light source and an optical recording medium, for changing the traveling path of an incident beam;

a first polarization beam splitter disposed between the first light path changing means and the optical recording medium, for selectively transmitting or reflecting the incident beam according to polarized component to diverge first and second polarized component beams from the incident beam;

a beam shaping unit disposed on the optical path of the second polarized component beam diverged by the first polarization beam splitter, the beam shaping unit for shaping the second polarized component beam;

a second optical path changing means disposed on the optical path between the first polarization beam splitter and the optical recording medium, for making the first and second polarized component beams diverged by the first polarization beam splitter head in the same optical path;

an objective lens disposed between the second optical path changing means and the optical recording medium, for converging the first and second polarized component beams incident thereto onto the optical recording medium;

a second polarization beam splitter for making the first and second polarized component beams that have been reflected by the optical recording medium and incident thereto through the objective lens, the second optical path changing mean, the first polarization beam splitter and the first optical path changing means in sequence head in different optical paths;

a photodetector having first and second light receiving portions for receiving the first and second polarized component beams, respectively, diverged by the second polarization beam splitter; and an operation unit for operating signals received by the first and second light receiving portions of the photodetector to eliminate cross-talk from a detected radio frequency (RF) signal.

2. The optical pickup of claim 1, wherein a shield plate having a transmission region for transmitting the incident beam and a shield region formed outside the transmission region, for shielding a part of the incident beam in a tangent line direction of the optical recording medium, is adopted as the beam shaping unit, such that the first polarized component of the incident beam is converged on a main track of the optical recording medium, and the second polarized component thereof is converged across the main track and adjacent tracks in a radial direction of the optical recording medium.

3. The optical pickup of claim 1, wherein a cylindrical lens for shaping the second polarized component beam into an oval-shaped beam having the major axis in a radial direction of the optical recording medium and the minor axis in a tangent line direction thereof is adopted as the beam shaping unit, such that the first polarized component of the incident beam is converged on a main track of the optical recording medium, and the second polarized component thereof is converged across the main track and adjacent tracks in a radial direction of the optical recording medium.

4. The optical pickup of claim 2, wherein the second light path changing means comprises:

a reflection prism for twice reflecting one of the first and second polarized component beams diverged by the first polarization beam splitter such that the beam is emitted therefrom while the optical axis of the beam being shifted parallel to the beam incident thereto;

a beam splitter for selectively transmitting or reflecting one of the first and second polarized component beams diverged by the first polarization beam splitter, which does not enter the reflection prism, and the beam through the reflection prism, such that the two beams head toward the optical recording medium through the same optical path.

5. The optical pickup of claim 1, wherein the operation unit comprises:

first and second current-to-voltage converters for converting current signals that have been photoelectrically converted by the first and second light receiving portions of the photodetector and output thereto, respectively, into voltage signals;

a multiplier for multiplying the voltage value from the second current-to-voltage converter by an operation constant K; and a differential amplifier for differentially amplifying the voltage signal from the first current-to-voltage converter and the signal output from the multiplier, to output a detected radio frequency (RF) signal.

6. The optical pickup of claim 1, further comprising:

a collimating lens disposed between the light source and the first optical path changing means, the collimating lens for converging the emanated beam incident thereto; and a condensing lens disposed between the second polarization beam splitter and the photodetector, the condensing lens for condensing the beam incident thereto.

* * * * *